July 18, 1950           C. R. BANKS           2,515,169

FILM OBSERVATION WINDOW FOR MOTION-PICTURE CAMERAS

Filed Oct. 24, 1947

Inventor

Claude R. Banks

By Harry C. Schroeder

Attorney

Patented July 18, 1950

2,515,169

UNITED STATES PATENT OFFICE 2,515,169

FILM OBSERVATION WINDOW FOR MOTION-PICTURE CAMERAS

Claude R. Banks, San Francisco, Calif.

Application October 24, 1947, Serial No. 781,814

4 Claims. (Cl. 88—16)

This invention relates to motion picture cameras of the hand type, and has for its principal object of the provision of a camera having an aperture or window whereby the operator is enabled to observe the rotation of the reel of unexposed film.

A further object of the invention is the provision of an observation window having an adjustable mirror whereby the film reel can be observed from various selected angles.

A still further object of the invention is the provision of a reel so marked as to be easily observed through the aperture.

The conventional camera of the type to which my invention is adapted, is equipped with a dial calibrated to indicate the consumption, in feet, of the film as it is exposed, however, due to its location, the dial cannot be observed while the camera is in operation. Due to this condition, it frequently occurs that the operator is unaware that the reel of film has become exhausted, and only realizes what has transpired upon the development of the film.

A camera equipped with my spool observation window can be operated while checking the spool to ensure rotation of the same.

I accomplish the above objects by the device described in the following specification, and illustrated in the accompanying drawing, forming a part hereof, and in which.

Figure 1:
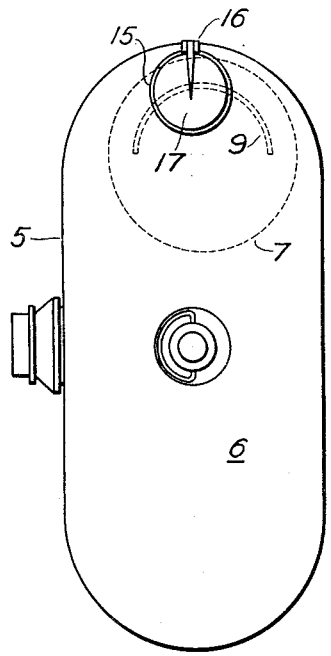
Figure 1 is a side elevation of a conventional camera fitted with my device.
Figure 2:
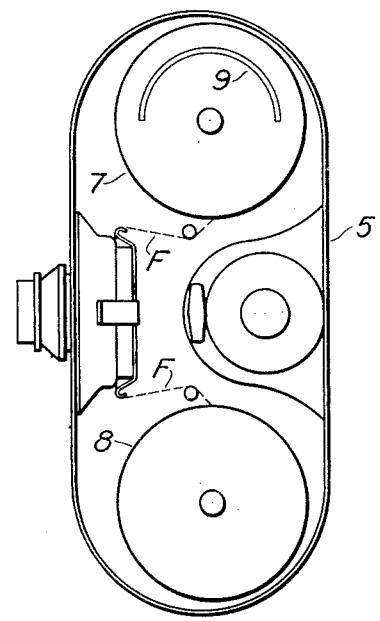
Figure 2 is a side elevation of the camera, with the film loading cover removed, illustrating the marked spool.

Referring to the drawing in detail, a conventional camera 5 with loading cover 6, is shown with spools 7 and 8 in operative position. The film F is indicated by a broken line on Figure 2. In operation, spool 8 is driven by the spring motor in the camera, and the film F is unwound from the spool 7 which ceases to revolve when the roll of film has been entirely unwound therefrom.

It will be obvious that any device that will enable the operator to observe roll 7, while the camera is in use, will be of inestimable value in preventing maloperation of the same.

The spool 7 has marked on the side thereof, an indicator mark 9 which is disclosed as a concentric semicircular line of a color, contrasting to the color of the spool proper. This can be accomplished by either marking the spool, or affixing a paper label thereto. Of course, any other pattern could be adopted which will enable rotation of the spool to be observed, such as quadrants of contrasting colors, radial lines, or the like.

In order to observe the line 9, I provide an aperture in the cover 6, having a fitting 10 mounted therein. The fitting 10 is of annular form, threaded on both the inside and the outside, and having a flange 11 extending outwardly to form a seat on the inside of the cover 6, and inwardly to form a shoulder against which a plastic disc 12 is seated. The disc 12, which is transparent, and tinted to exclude harmful light rays, is held in place by an externally threaded ring 13 engaging the internal threads of the fitting 10.

Figure 3:
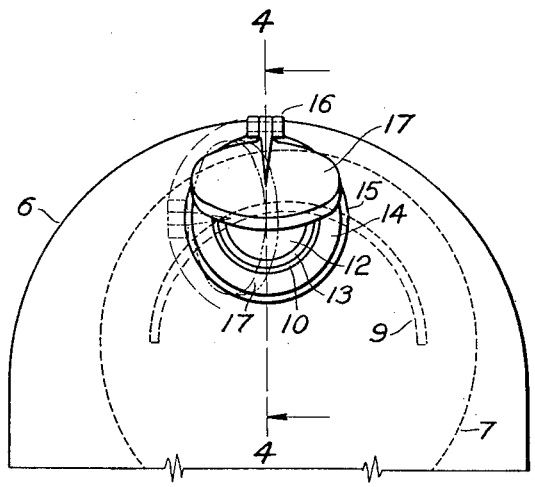
Figure 3 is an enlarged fragmentary elevation of the film loading cover.

A flanged annular nut 14 engages the exterior threads of the fitting 10, locking it in place in the cover 6 and also serves as a mounting for a frame 15 adapted to swivel thereon. The frame 15 has pivotally mounted thereon, by means of a hinge 16, a circular aperture cover 17 having a mirror 18 mounted in the inner side thereof. The frame 15 can be rotated, to the desired position, as shown on Figure 3, and the cover 17 and mirror 18 can be set at the desired angle, as shown on Figure 4.

By the above means, the operator of the camera is able to adjust the mirror to his own satisfaction, and can then readily observe the rotation of the reel 7, while using the camera, by merely glancing at the mirror in which the marked reel surface will be reflected.

Figure 4:
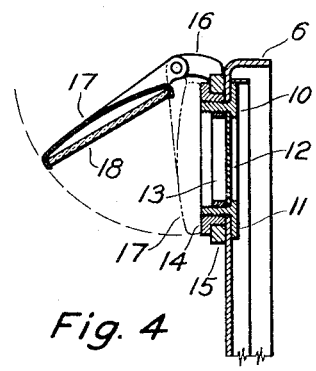
Figure 4 is a section taken on line 4—4 of Figure 3.

The cover 17 is, of course, kept in the closed position, as shown in phantom on Figure 4, when the camera is not in use.

While I have disclosed a preferred embodiment of my invention, it should be understood that modification may be made within the spirit and scope of the appended claims.

I claim:

1. In combination with a motion picture camera having a film reel therein and an aperture in a side wall thereof adjacent said reel of film, a reflector, and a mounting device rotatable substantially about said aperture and pivotally supporting said reflector to direct reflection of said film from said aperture for observation outside of and along said side of the camera.

2. In a motion picture camera, a film reel rotating in the camera, a motion indicating element rotating with the reel in said camera, said camera having an aperture on a side thereof aligned with the path of rotation of said indicated element; a frame mounted in said aperture, and a transparent film protecting member held by the frame over said aperture, a cover for said aperture, a reflecting surface on the face of the cover adjacent said aperture, and a support for holding said cover on said frame adjustably about an axis generally perpendicular the plane of said aperture and about another axis generally parallel with the plane of said aperture for reflecting said indicating element at a selected angle with respect to said aperture.

3. In a motion picture camera, a film reel rotating in the camera, a motion indicating element rotating with the reel in said camera, said camera having an aperture on a side thereof aligned with the path of rotation of said indicated element; a frame in said aperture, an observation window held on said aperture by said frame, a support rotatable on said frame, a reflector cover pivoted on said support for covering said aperture and adjustable around its pivot and with said support to reflect said indicating element from said aperture at a selected angle.

4. In a motion picture camera, a film reel rotating in the camera, a motion indicating element rotating with the reel in said camera, said camera having an aperture on a side thereof aligned with the path of rotation of said indicating element; a frame in said aperture, an observation window held on said aperture by said frame, a support rotatable on said frame, a reflector cover pivoted on said support for covering said aperture and adjustable around its pivot and with said support to reflect said indicating element from said aperture at a selected angle, said frame including a bushing threaded externally and internally, a retaining flange on the inner end of the bushing bearing against the inside of the camera around said aperture, an abutment in said bushing near the inner end thereof, a threaded clamping ring inside said bushing to hold said observation window against said abutment and an outer ring threaded on the outside of said bushing and being adapted to rotatably hold said rotatable support on said frame.

CLAUDE R. BANKS.

REFERENCES CITED

The following references are of record in the file of this patent:

UNITED STATES PATENTS

| Number | Name | Date |
| --- | --- | --- |
| 1,118,512 | Power | Nov. 24, 1914 |
| 1,676,540 | Frederick | July 10, 1925 |
| 2,082,857 | Thoroughgood et al. | June 8, 1937 |

FOREIGN PATENTS

| Number | Country | Date |
| --- | --- | --- |
| 4,096 | Great Britain | of 1913 |
| 351,482 | Great Britain | June 25, 1931 |